(12) United States Patent
Murakami

(10) Patent No.: US 8,259,357 B2
(45) Date of Patent: Sep. 4, 2012

(54) IMAGE PROCESSING APPARATUS, IMAGE FORMING APPARATUS, IMAGE PROCESSING METHOD, AND COMPUTER READABLE RECORDING MEDIUM

(75) Inventor: Yoshinori Murakami, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 965 days.

(21) Appl. No.: 12/044,608

(22) Filed: Mar. 7, 2008

(65) Prior Publication Data
US 2008/0218803 A1 Sep. 11, 2008

(30) Foreign Application Priority Data
Mar. 9, 2007 (JP) .................... 2007-060944

(51) Int. Cl.
*H04N 1/40* (2006.01)
(52) U.S. Cl. ........ 358/3.01; 358/3.1; 358/3.15; 358/2.1; 358/1.9; 358/1.6; 358/448; 382/266
(58) Field of Classification Search ............ 358/3.1, 358/3.15, 2.1, 1.6, 1.9, 448; 382/266
See application file for complete search history.

(56) References Cited

U.S. PATENT DOCUMENTS

| 5,086,484 A | 2/1992 | Katayama et al. |
| 5,408,338 A * | 4/1995 | Koike ............... 358/448 |
| 5,488,673 A | 1/1996 | Katayama et al. |
| 6,285,800 B1 * | 9/2001 | Yamazaki et al. ...... 382/266 |
| 6,671,068 B1 * | 12/2003 | Chang et al. ............ 358/1.9 |
| 6,744,532 B1 * | 6/2004 | Chen ............... 358/1.9 |
| 2003/0210430 A1 * | 11/2003 | Nose et al. ............ 358/2.1 |
| 2005/0141037 A1 * | 6/2005 | Shin ............... 358/3.15 |
| 2008/0239335 A1 * | 10/2008 | Lee et al. ............ 358/1.6 |

FOREIGN PATENT DOCUMENTS

| JP | 3-34772 A | 2/1991 |
| JP | 8-214159 A | 8/1996 |
| JP | 2755307 B2 | 5/1998 |
| JP | 2801195 B2 | 9/1998 |
| JP | 2001-292320 A | 10/2001 |

(Continued)

OTHER PUBLICATIONS

T. Kurosawa, The Journal of Image Electronics Engineers of Japan, vol. 20, No. 5, p. 443-449, 1991.

(Continued)

*Primary Examiner* — Thomas Lett
*Assistant Examiner* — Michael Burleson
(74) *Attorney, Agent, or Firm* — Birch, Stewart, Kolasch & Birch, LLP

(57) ABSTRACT

An error diffusion process section performs an error diffusion process on a pixel value of each of processing object pixels and outputs the processed pixel value to an output selection section. A blue noise mask process performs a blue noise mask process on a pixel value of each of processing object pixels and outputs the processed pixel value to the output selection section. The output selection section selects and outputs the pixel value outputted from the error diffusion process section when a segmentation class signal indicates a character (text) area or a halftone dot area, namely an edge area, and selects and outputs the pixel value outputted from the blue noise mask process section when a segmentation class signal indicates an area other than the character area or the halftone dot area, namely non-edge area.

20 Claims, 16 Drawing Sheets

FOREIGN PATENT DOCUMENTS

| | | |
|---|---|---|
| JP | 2002-232708 A | 8/2002 |
| JP | 2003-250043 A | 9/2003 |
| JP | 2004-289368 A | 10/2004 |
| JP | 2005-260399 A | 9/2005 |
| JP | 2005-354129 A | 12/2005 |
| JP | 2006287474 A | 10/2006 |

OTHER PUBLICATIONS

T. Makita, The Journal of Image Electronics Engineers of Japan, vol. 40, No. 3, p. 237-243, 2001.

* cited by examiner

FIG. 2

| -2 | -1 | 0 | -1 | -2 |
|---|---|---|---|---|
| -1 | -4 | -2 | -4 | -1 |
| 0 | -2 | 92 | -2 | 0 |
| -1 | -4 | -2 | -4 | -1 |
| -2 | -1 | 0 | -1 | -2 |

FIG. 5A

|   | * | 7/16 |
|---|---|---|
| 3/16 | 5/16 | 1/16 |

FIG. 5B

| * | 1/2 |
|---|---|
| 1/2 | |

FIG. 5C

| * | 1 |

IMAGE PROCESSING APPARATUS, IMAGE FORMING APPARATUS, IMAGE PROCESSING METHOD, AND COMPUTER READABLE RECORDING MEDIUM

CROSS-REFERENCE TO RELATED APPLICATION

This application claims priority to Japanese Patent Application No. 2007-060944, which was filed on Mar. 9, 2007, the contents of which are incorporated herein by reference in its entirety.

BACKGROUND OF THE INVENTION

1. Field of the Invention

The present invention relates to an image processing apparatus, an image forming apparatus, an image processing method, and a computer readable recording medium, each capable of converting image data inputted thereto into image data with a predetermined gray level level.

2. Description of the Related Art

In recent years, digitalization of office automation (OA) equipment has rapidly progressed, and a demand for color image output has increased, which has caused image output apparatuses such as an electrophotographic digital color copier or an inkjet or thermal transfer color printer to be in widespread use. For example, image data inputted from an image input apparatus such as a digital camera or a scanner or image data created with a computer is outputted using such image output apparatuses. Since the number of gray levels of an image, which can be outputted from the image output apparatus, is smaller than the number of gray levels of image data inputted thereto in most cases, in such an image output apparatus, a pseudo tone reproduction process is performed on the inputted image data before outputting the image.

As one of the tone reproduction processes, an error diffusion method is cited. Since a fixed error diffusion coefficient is applied to all of the pixels in the error diffusion method, an accumulative error becomes periodical, resulting in textures or worms.

In order for preventing generation of such textures, there is proposed a technology for switching a position of the error diffusion coefficient at random by switching a position of a weighting coefficient with a random number (refer to Toshiharu Kurosawa, "Output image characteristic in Modified Error Diffusion (MED) method," The journal of The Institute of Image Electronics Engineers of Japan, 1991, vol. 20, No. 5, pp. 443-449, for example).

Further, as a process having a property of achieving substantially the same image quality as the error diffusion method even with a dither method, there is cited a blue noise mask method. The blue noise mask method has the same processing method as the dither method except the threshold mask, which is large and has a similar arrangement of the threshold values to the dot profile of the error diffusion method. Therefore, it requires only smaller size of hardware than that of the error diffusion method for performing the pseudo tone reproduction process. In inkjet printers using dark and light inks, the error diffusion method is applied to images reproduced with the light ink while the blue noise mask method is applied to images reproduced by the dark ink because of a problem of affinity of the dot arrangement (refer to Tsuyoshi Makita, "High-Quality Picture Technologies in Inkjet Printers," The journal of The Institute of Image Electronics Engineers of Japan, 2001, vol. 40, No. 3, pp. 237-243, for example).

In the case in which all of the pixels are processed with the blue noise mask method, there arises a problem that the peripheries of characters and line drawings become awkwardly spattering in the output, or that an awkward granular output is caused in a halftone dot area by interference with the original halftone pattern, although different form the moire occurred in the dither method, unless the halftone dot area is sufficiently smoothed in the former process.

Further, in the process using the error diffusion method, it is required for preventing generation of the textures to switch the position of the error diffusion coefficient based on a random number as described above or to diffuse the quantization error two lines ahead thereof. Thus, there arises a problem that in the error diffusion method which requires an already large-scale apparatus, growth in size of the processing circuit occurs, or a large capacity line buffer for storing the quantization error or the accumulated error becomes necessary.

SUMMARY OF THE INVENTION

An object of the invention is to provide an image processing apparatus, an image forming apparatus, an image processing method, and a computer readable recording medium, each capable of improving the image quality of the image obtained by the tone reproduction processing, and further of allowing the scale of the apparatus to be reduced.

The invention provides an image processing apparatus comprising:

a segmentation process section for classifying whether each of pixels forming inputted image data belongs to at least an edge area or a non-edge area; and a tone reproduction process section for converting the inputted image data into an image data with a predetermined gray level and outputting the converted image data, the tone reproduction process section including:

an error diffusion process section for performing conversion of gray level using an error diffusion method;

a blue noise mask process section for performing conversion of the gray level using a blue noise mask method; and an output selection section for outputting a gray level value converted by the error diffusion process section in the case in which a processing object pixel belongs to the edge area, and outputting a gray level value converted by the blue noise mask process section in the case in which the pixel belongs to the non-edge area.

According to the invention, the error diffusion process section performs the conversion of the gray level using the error diffusion method, and the blue noise mask process section performs the conversion of the gray level using the blue noise mask method. The output selection section outputs a gray level value converted by the error diffusion process section in the case in which a processing object pixel belongs to the edge area, and outputs a gray level value converted by the blue noise mask process section in the case in which the pixel belongs to the non-edge area.

Since the suitable tone reproduction process is performed in accordance with the area where the pixel belongs to, the image quality of the image obtained by the tone reproduction process is improved. In particular, by performing the error diffusion process on the edge area, the circuit scale can be reduced while improving the image quality.

Further, the invention provides an image processing apparatus comprising:

a segmentation process section for classifying whether each of pixels forming inputted image data belongs to at least an edge area or a non-edge area; and a tone reproduction process section for converting the inputted image data into an image data with a predetermined gray level and outputting the converted image data, wherein the tone reproduction section performs the conversion of the gray level using an error diffusion method, and selects a fixed threshold value in the case in which a processing object pixel belongs to the edge area, and selects a threshold value corresponding to a position of the processing object pixel from a threshold mask to quantize a gray level value by a threshold process using the selected threshold value.

According to the invention, the tone reproduction section performs the conversion of the gray level using an error diffusion method. In more detail, the tone reproduction process section selects a fixed threshold value in the case in which a processing object pixel belongs to the edge area, and selects a threshold value corresponding to a position of the processing object pixel from a threshold mask to quantize a gray level value by a threshold process using the selected threshold value.

Since the suitable tone reproduction process is performed in accordance with the area where the pixel belongs to, the image quality of the image obtained by the tone reproduction process is improved. By mainly performing the error diffusion process, the circuit scale can be reduced while improving the image quality.

Further, in the invention, it is preferable that the tone reproduction process section stores an error diffusion coefficient for the edge area and an error diffusion coefficient for the non-edge area, and selects the error diffusion coefficient for the edge area in the case in which the processing object pixel belongs to the edge section, selects the error diffusion coefficient for the non-edge area in the case in which the pixel belongs to the non-edge section, and calculates the diffusion error using the selected error diffusion coefficient.

According to the invention, the tone reproduction process section stores an error diffusion coefficient for the edge area and an error diffusion coefficient for the non-edge area, selects the error diffusion coefficient for the edge area in the case in which the processing object pixel belongs to the edge section, selects the error diffusion coefficient for the non-edge area in the case in which the pixel belongs to the non-edge section, and calculates the diffusion error using the selected error diffusion coefficient.

Thus, the suitable tone reproduction process can be performed using the error diffusion coefficient corresponding to the respective areas.

Further, in the invention, it is preferable that the error diffusion coefficient for the non-edge area is zero.

According to the invention, the error diffusion coefficient for the non-edge area is set to zero. Thus, substantially the same process as the blue noise mask process can be performed on the non-edge area with the circuit configuration based on the error diffusion processing method.

Further, in the invention, it is preferable that the tone reproduction process section does not substantially carry out the error diffusion by the error diffusion method in the case in which the processing object pixel belongs to the non-edge area.

According to the invention, the error diffusion by the error diffusion method is not substantially carried out in the case in which the processing object pixel belongs to the non-edge area. Thus, substantially the same process as the blue noise mask process can be performed on the non-edge area with the circuit configuration based on the error diffusion processing method.

Further, in the invention, it is preferable that the error diffusion process is performed using a set of error diffusion coefficients.

According to the invention, the error diffusion process is performed using a set of error diffusion coefficients. Thus, the more preferable tone reproduction process can be performed on the pixels belonging to the edge area compared to the case of changing the error diffusion coefficient every pixel, and at the same time, the circuit for changing the error diffusion coefficient every pixel and the storage capacity required for storing the error diffusion coefficients can be reduced.

Further, in the invention, it is preferable that the pixels to which the error is diffused based on the error diffusion coefficient are, related to the processing pixel, an unprocessed next pixel, a pixel in the same position on the next line, and pixels on both of left and right sides of the pixel in the same position on the next line.

According to the invention, the pixels to which the error is diffused based on the error diffusion coefficient are, related to the processing pixel, an unprocessed next pixel, a pixel in the same position on the next line, and pixels on both of left and right sides of the pixel in the same position on the next line.

Since the error diffusion process is performed only on the edge area, the error diffusion up to the next line can achieve sufficient image quality, the processing circuit for diffusing the error and the storage space for storing the diffusion errors can be eliminated.

Further, in the invention, it is preferable that the pixels to which the error is diffused based on the error diffusion coefficient are, related to the processing pixel, an unprocessed next pixel and a pixel in the same position on the next line.

According to the invention, the pixels to which the error is diffused based on the error diffusion coefficient are, related to the processing pixel, an unprocessed next pixel and a pixel in the same position on the next line.

Thus, the processing circuit for diffusing the error and the storage space for storing the diffusion errors can be eliminated with very little degradation in the image quality.

Further, in the invention, it is preferable that the pixel to which the error is diffused based on the error diffusion coefficient is an unprocessed next pixel related to the processing pixel.

According to the invention, the pixel to which the error is diffused based on the error diffusion coefficient is an unprocessed next pixel related to the processing pixel.

Thus, the processing circuit for diffusing the error and the storage space for storing the diffusion errors can be eliminated with very little degradation in the image quality.

Further, in the invention, it is preferable that each of the pixels includes a plurality of color components, and the tone reproduction process section performs conversion of the gray level for each of the color components, and selects the threshold mask for each of the color components.

According to the invention, each of the pixels includes a plurality of color components, and the tone reproduction process section performs the conversion of the gray level for each of the color components, and selects the threshold mask for each of the color components.

Thus, the threshold mask with which the overlap of the output dots of the respective color components becomes as hard as possible can be set, and consequently, the image quality can be improved compared to the case of using the same threshold mask among the color components.

Further, the invention provides an image forming apparatus comprising:

an image input apparatus for inputting image data to an image processing apparatus;

the image processing apparatus described above; and an image output apparatus for forming an image based on the image data with a gray level converted by the image processing apparatus.

According to the invention, when the image input apparatus input the image data to the image processing apparatus, the image processing apparatus performs the image process described above on the image data, and outputs the image data. The image output apparatus forms the image based on the image data having the converted gray level.

Thus, the image quality of the output image on which the gray level process is performed is improved. In particular, by performing the error diffusion process on the edge area, the circuit scale can be reduced while improving the image quality.

According to the invention, in the error diffusion process step the conversion of the gray level is performed using the error diffusion method, and in the blue noise mask process step the conversion of the gray level is performed using the blue noise mask method. In the output selection step a gray level value converted in the error diffusion process step is outputted in the case in which a processing object pixel belongs to the edge area, and a gray-level value converted in the blue noise mask process step is outputted in the case in which the pixel belongs to the non-edge area.

Since the suitable tone reproduction process is performed in accordance with the area where the pixel belongs to, the image quality of the image obtained by the tone reproduction process is improved. In particular, by performing the error diffusion process on the edge area, the circuit scale can be reduced while improving the image quality.

Further, the invention provides an image processing method comprising:

a segmentation process step of classifying whether each of pixels forming inputted image data belongs to at least an edge area or a non-edge area; and a tone reproduction process step of converting the inputted image data into an image data with a predetermined gray level and outputting the converted image data, the tone reproduction process step including:

a selection step of selecting a fixed threshold value in the case in which a processing object pixel belongs to the edge area, and selecting a threshold value corresponding to a position of the processing object pixel from a threshold mask;

a quantization step of quantizing the gray level value by a threshold process using the selected threshold value; and an error diffusion step of performing the error diffusion using the error diffusing method.

According to the invention, in the selection step, a fixed threshold value is selected in the case in which a processing object pixel belongs to the edge area, and a threshold value corresponding to a position of the processing object pixel is selected from a threshold mask. The gray level value is quantized by the threshold process using the threshold selected in the quantization step, and the error diffusion is performed by the error diffusion method in the error diffusion step.

Since the suitable tone reproduction process is performed in accordance with the area where the pixel belongs to, the image quality of the image obtained by the tone reproduction process is improved. In particular, by performing the error diffusion process on the edge area, the circuit scale can be reduced while improving the image quality.

Further, the invention provides an image processing method comprising:

a segmentation process step of classifying whether each of pixels forming inputted image data belongs to at least an edge area or a non-edge area; and a tone reproduction process step of converting the inputted image data into an image data with a predetermined gray level and outputting the converted image data, wherein in the tone reproduction process step, the conversion of the gray level is performed by the error diffusion method in the case in which the processing object pixel belongs to the edge area, and the conversion of the gray level is performed by the blue noise mask method in the case in which the pixel belongs to the non-edge area.

According to the invention, the conversion of the gray level is performed by the error diffusion method in the case in which the processing object pixel belongs to the edge area, and the conversion of the gray level is performed by the blue noise mask method in the case in which the pixel belongs to the non-edge area.

Since the suitable tone reproduction process is performed in accordance with the area where the pixel belongs to, the image quality of the image obtained by the tone reproduction process is improved. In particular, by performing the error diffusion process on the edge area, the circuit scale can be reduced while improving the image quality.

Further, the invention provides a computer readable recording medium recording an image processing program for making a computer execute the image processing method described above.

According to the invention it is possible to provide an image processing program for making a computer execute the image processing method described above, and a computer readable recording medium recording the image processing program.

BRIEF DESCRIPTION OF THE DRAWINGS

Other and further objects, features, and advantages of the invention will be more explicit from the following detailed description taken with reference to the drawings wherein:

FIG. 2 is a diagram showing an example of filter coefficients used for a slightly emphasizing process;

FIGS. 5A to 5C are diagrams showing examples of a error diffusion coefficient matrix;

FIG. 7A shows a figure showing an example of a threshold mask for 32×32 pixels for cyan;

FIG. 7B shows a figure showing an example of a threshold mask for 32×32 pixels for magenta;

FIG. 7C shows a figure showing an example of a threshold mask for 32×32 pixels for yellow;

FIG. 7D shows a figure showing an example of a threshold mask for 32×32 pixels for black;

DETAILED DESCRIPTION

Figure 1:
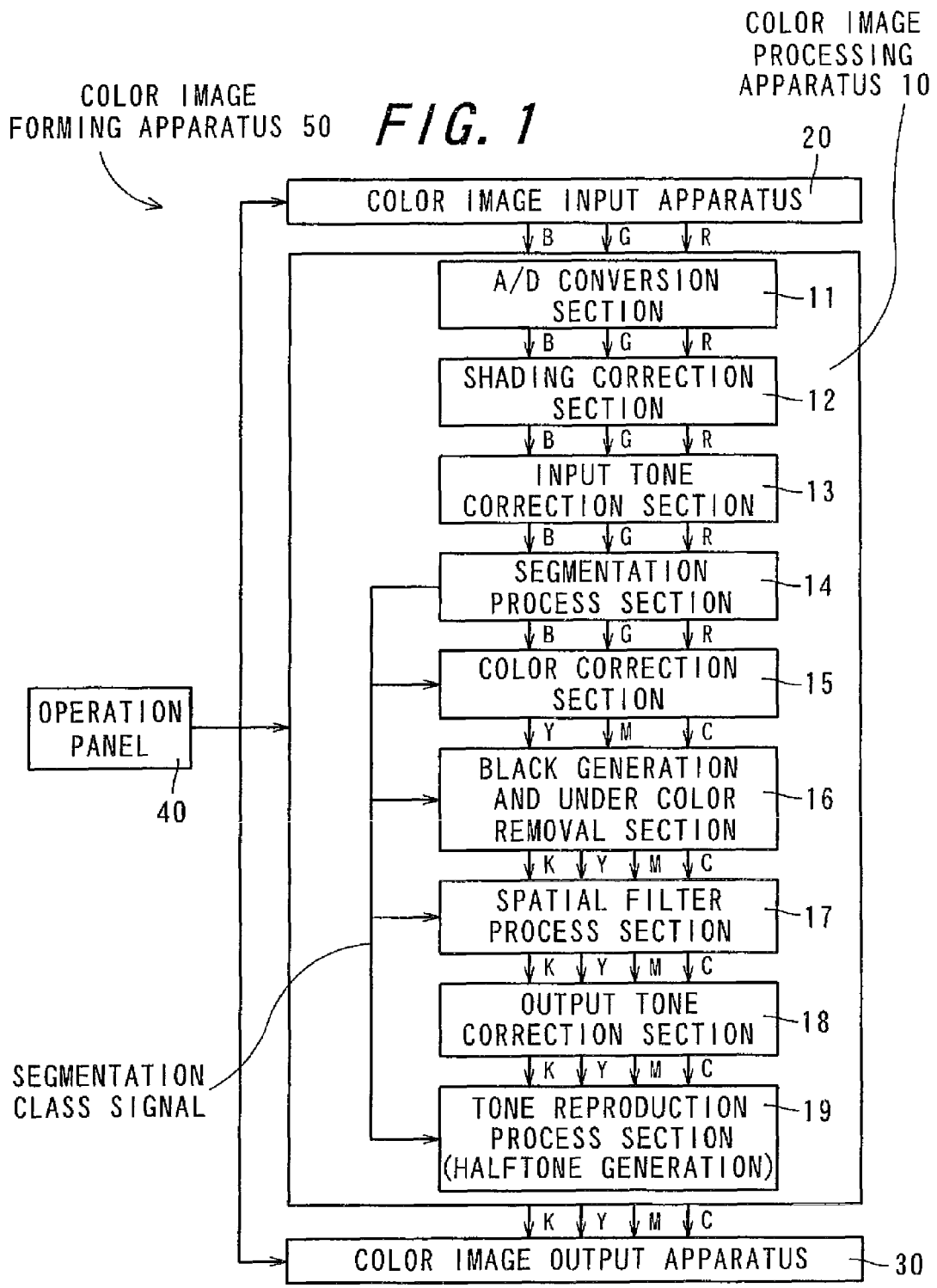
FIG. 1 is a block diagram showing a schematic configuration of a color image forming apparatus according to a first embodiment of the invention.

Now referring to the drawings, preferred embodiments of the invention are described below.

First Embodiment

FIG. 1 is a block diagram showing a schematic configuration of a color image forming apparatus 50 according to a first embodiment of the invention. The color image forming apparatus 50 comprises a color image processing apparatus 10, a color image input apparatus 20, a color image output apparatus 30, and an operation panel 40, and can be realized as, for example, a color digital color copier.

As shown in FIG. 1, the color image processing apparatus 10 comprises an analog/digital (A/D) conversion section 11, a shading correction section 12, an input tone correction section 13, a segmentation process section 14, a color correction section 15, a black generation and under color removal section 16, a spatial filter process section 17, an output tone correction section 18, and a tone reproduction process section 19.

The color image input apparatus 20 is constituted by a scanner section provided, for example, with a charge coupled device (hereinafter referred to as CCD) image sensor, and is for reading a reflected light image from a paper sheet on which a document image is recorded, as analog color signals of RGB (R: red, G: green, B: blue) as image data using the CCD image sensor, and inputting them to the color image processing apparatus 10.

The analog color signals read by the color image input apparatus 20 are transmitted inside the color image processing apparatus 10 in the order of the analog/digital (A/D) conversion section 11, the shading correction section 12, the input tone correction section 13, the segmentation process section 14, the color correction section 15, the black generation and under color removal section 16, the spatial filter process section 17, the output tone correction section 18, and the tone reproduction process section 19, and outputted to the color image output apparatus 30 as digital color signals of CMYK (C: cyan, M: magenta, Y: yellow, and K: black).

The A/D conversion section 11 converts the analog color signals of RGB inputted thereto into the digital color signals as image data. The shading correction section 12 performs process for eliminating various strains caused in a lighting system, image focusing system, and image sensing system of the color image input apparatus 20 on the digital color signals of RGB transmitted from the A/D conversion section 11.

The input tone correction section 13 adjusts the color balance of the RGB signals (reflectance signals of RGB) from which the various strains are eliminated in the shading correction section 12, and at the same time, converts the RGB signals into signals, which are easy for the color image processing apparatus 10 to handle, such as density signals.

The segmentation process section 14 separates each of the pixels of the inputted image data into the pixels belonging to any of a plurality of areas such as a character (text) area, a halftone dot area, or a photograph (continuous tone) area based on the RGB signals.

Then, the segmentation process section 14 outputs a segmentation class signal indicating what area the pixel belongs to, to the color correction section 15, the black generation and under color removal section 16, the spatial filter process section 17, and the tone reproduction process section 19 based on the separation results described above, and outputs the inputted signal directly to the color correction section 15 at the posterior stage.

As the segmentation process, it is possible to separate the pixels into a page background area, the picture area, the character area, and the halftone dot area by, for example, calculating a maximum density difference and an total density busyness, and comparing them with a plurality of predetermined threshold values. Herein, the maximum density difference is defined as a difference between the minimum density value (the minimum pixel value) and the maximum density value (the maximum pixel value) in the n×m blocks (e.g., 15×15 pixels) including the processing object pixel. The total density busyness is defined as a summation of the absolute value of the density difference between adjacent pixels. In the invention, after separating the pixels in to the areas described above, it is judged that the pixel in the page background area or the picture area belongs to a non-edge area, and that the pixel in the character area or the halftone dot area belongs to an edge area. A specific example of the segmentation process is described in, for example, Japanese Unexamined Patent Publication JP-A 2002-232708.

Regarding the density distribution of the page background area, since the density variation is usually small, the maximum density difference and the total density busyness both become very small. The density distribution in the picture area has a smooth density variation, and the maximum density difference and the total density busyness therein both become small, but slightly larger than those in the page background area. The density distribution in the halftone dot area has a variation depending on the halftone dots, but regarding the total density busyness, since the density variation is caused correspondingly to the number of halftone dots, the proportion of the total density busyness to the maximum density difference becomes large.

Therefore, in the case in which the total density busyness is larger than the product of the maximum density difference and the character/halftone dot determination threshold (one of the plurality of threshold values), it is judged to be the halftone dot area. The density distribution in the character area has a large maximum density difference, and the total density busyness therein also becomes large accordingly, however, since the density variation therein is smaller than that in the halftone dot area, the total density busyness therein becomes smaller than that in the halftone dot area. Therefore, in the case in which the total density busyness is smaller than the product of the maximum density difference and the character/halftone dot determination threshold, it is judged to be the character area.

Therefore, the comparison between the calculated maximum density difference and the maximum density difference threshold and the comparison between the calculated total density busyness and the total density busyness threshold are performed, and in the case in which the maximum density difference is smaller than the maximum density difference threshold, and the total density busyness is smaller than the total density busyness threshold, it is judged that the processing object pixel is in the page background/picture area, and otherwise it is judged that the processing object pixel is in the character/halftone dot area.

Further, in the case in which it is judged that it is in the page background/picture area, the comparison between the calculated maximum density difference and the page background/picture determination threshold is performed. In the case in which the maximum density difference is smaller than the page background/picture determination threshold, it is judged to be the page background area. In the case in which the maximum density difference is larger than the page background/picture determination threshold, it is judged to be the picture area. In the case in which it is judged to be the character/halftone dot area, the comparison between the calculated total density busyness and the product of the maximum density difference and the character/halftone dot determination threshold is performed. In the case in which the total density busyness is smaller than the product of the maximum density difference and the character/halftone dot determination threshold, it is judged to be the character area. In the case in which the total density busyness is larger than the product of the maximum density difference and the character/halftone dot determination threshold, it is judged to be the halftone dot area.

The color correction section 15 is for performing a process for eliminating color impurity based on the spectral characteristic of CMY color materials including a useless absorption component in order for reproducing the colors faithfully. As the processing method, there are cited a method of providing the relationship between the input RGB signal and the output CMY signal as a look-up table (LUT) and a color masking method using a conversion matrix as in the following formula.

$$\begin{bmatrix} C \\ M \\ Y \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix}$$

For example, in the case in which the color masking method is used, there are prepared a number of pairs of ROB data and CMY data which is provided to the color image output apparatus 30, wherein the RGB data is obtained when a color patch is read by the color image input apparatus 20, which color patch has the same L*a*b* value (CIE 1976 L*a*b* signal (CIE: International Commission on Illumination, L*: luminance, a*, b*: chrominance)) as the L*a*b* value of a color outputted when the CMY data is provided to the color image output apparatus 30, the coefficients of the conversion matrix, $a_{11}$ through $a_{33}$, are calculated from the combinations of the pairs, and the color correction process is performed using the coefficients calculated. For higher accuracy, it is only required to add terms of the second order or higher.

The black generation and under color removal section 16 is for performing a process of forming a black (K) signal from the three color signals CMY on which the color correction process has been performed, and of generating new CMY signals by eliminating the portions where the original CMY signals overlap each other, thereby converting the three color signals CMY into four color signals CMYK.

The spatial filter process section 17 performs a spatial filtering process on the image data of the CMYK signals inputted from the black generation and under color removal section 16 by a digital filter based on the segmentation class signal. By correcting the spatial frequency characteristics, blur and deterioration in graininess of the outputted image can be prevented.

For example, in the area separated in the segmentation process section 14 as the character area, for improving in particular reproducibility of an achromatic text or a chromatic text, the high frequency component is emphasized with an edge enhancement process in the spatial filtering process of the spatial filter process section 17. Further, in the area separated in the segmentation process section 14 as the halftone dot area, a low-pass filtering process for eliminating the halftone dot component is not performed in the spatial filter process section 17, but the spatial filtering process is not performed (inhibited) or the high frequency component is emphasized with the edge enhancement process so that the halftone dot component is reproduced as much as possible.

Figure 2:
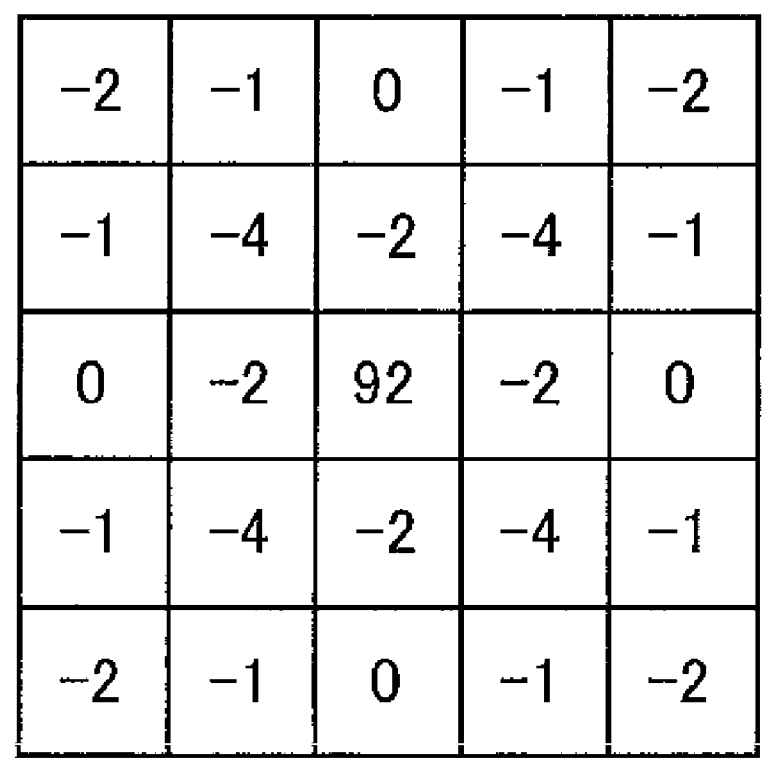

Regarding the halftone dot area, although in the related art a smoothing process is performed for preventing moire, the smoothing process changes the form of the halftone dot, which is not preferable in reproducing the halftone dots. Therefore, in the invention, the form of the halftone dot is retained by performing no particular process on the halftone dot area at all (not performing the spatial filtering process), or by performing a slightly emphasizing process thereon. FIG. 2 is a diagram showing an example of filter coefficients used for the slightly emphasizing process. It should be noted that although in the halftone dot area, the spatial filtering process in the spatial filter process section 17 is not performed or the edge enhancement process is performed, it is possible to perform a common filtering process independent of the areas.

The output tone correction section 18 performs an output tone correction process for converting the image data of CMYK signals based on an output characteristics of the image output apparatus 30. The tone reproduction section 19 performs a pseudo tone reproduction process on the image data of the CMYK signals based on the segmentation class signal so that the gray level can finally be reproduced in the image in a pseudo manner. In the invention, as a method to be applied to the pseudo tone reproduction process, the error diffusion method and the blue noise mask method are used.

The image data on which each of the processes described above is temporarily stored in a storage section (not shown), and is retrieved therefrom at given intervals to be outputted to the color image output apparatus 30. The color image output apparatus 30 is for outputting an image on a recording medium (e.g., paper), and examples of the output method may include an electrophotographic method or an inkjet method, but the output method of the color image output apparatus 30 is not particularly limited thereto.

The operation panel 40 is formed, for example, of a touch panel having a display section such as a liquid crystal display and an operation section such as setting buttons integrally thereon, and based on information inputted from the operation panel 40 by the user, the operations of the color image processing apparatus 10, the color image input apparatus 20, and the color image output apparatus 30 are controlled. It should be noted that each of the processes described above is controlled by a central processing unit (CPU) (not shown).

Figure 3:
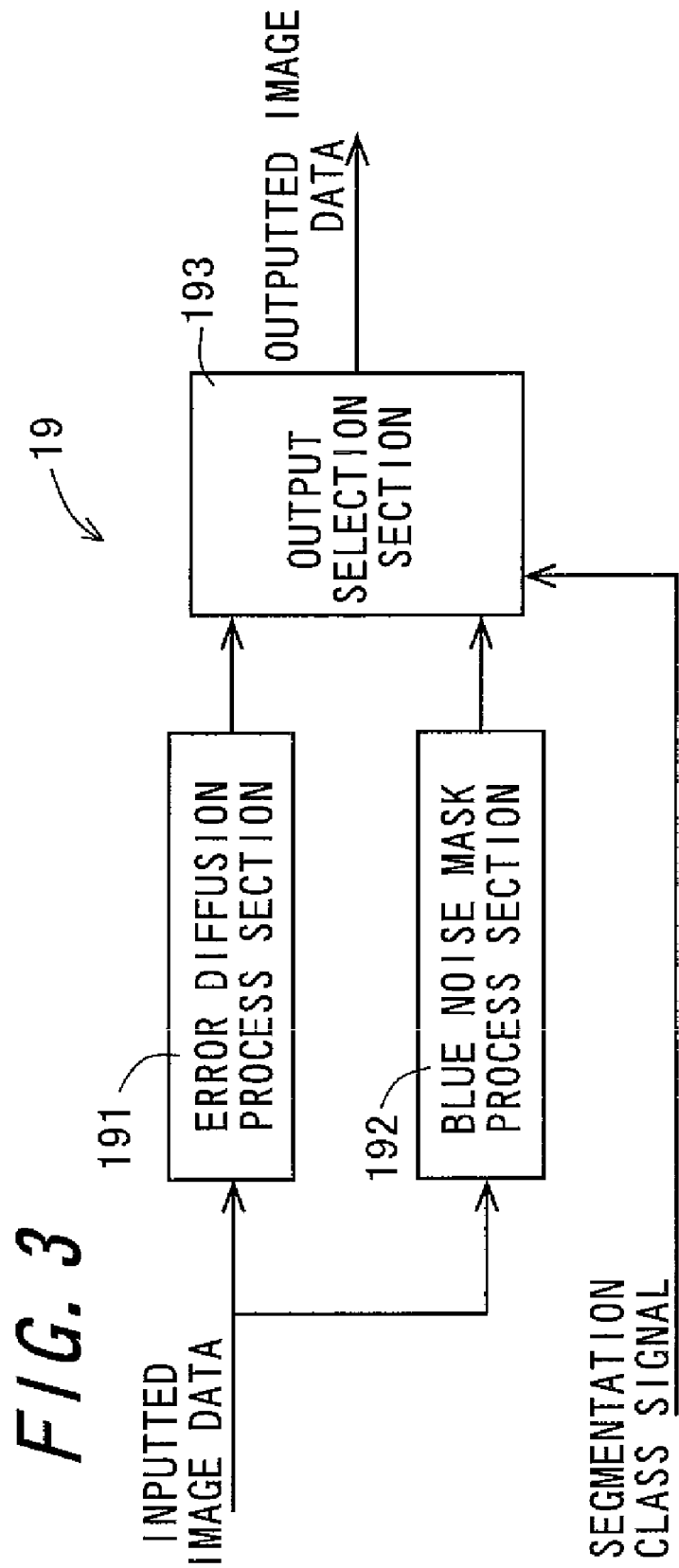
FIG. 3 is a block diagram showing a configuration of a tone reproduction section.

FIG. 3 is a block diagram showing a configuration of the tone reproduction section 19. The tone reproduction section 19 comprises an error diffusion process section 191, a blue noise mask process section 192, and an output selection section 193.

Each of the pixels of the image data is composed of four color components of CMYK, and halftone generation using the error diffusion method or the blue noise mask method is performed for every color component. Therefore, the error diffusion process or the blue noise mask process of each of the CMYK color components is performed sequentially with a common circuit, or the error diffusion process or the blue noise mask process of each of the CMYK color components is performed in parallel with respective circuits. It should be noted that since substantially the same process is performed for every color component in the error diffusion process or the blue noise mask process, the process for one of the color components will be explained in the following description, and regarding the process for other color components, only different points will be explained.

The error diffusion process section 191 performs the error diffusion process on the pixel value (density value) of each of processing object pixels of the image data inputted thereto, and outputs the error-diffusion-processed pixel values of the image data to the output selection section 193.

Figure 4:
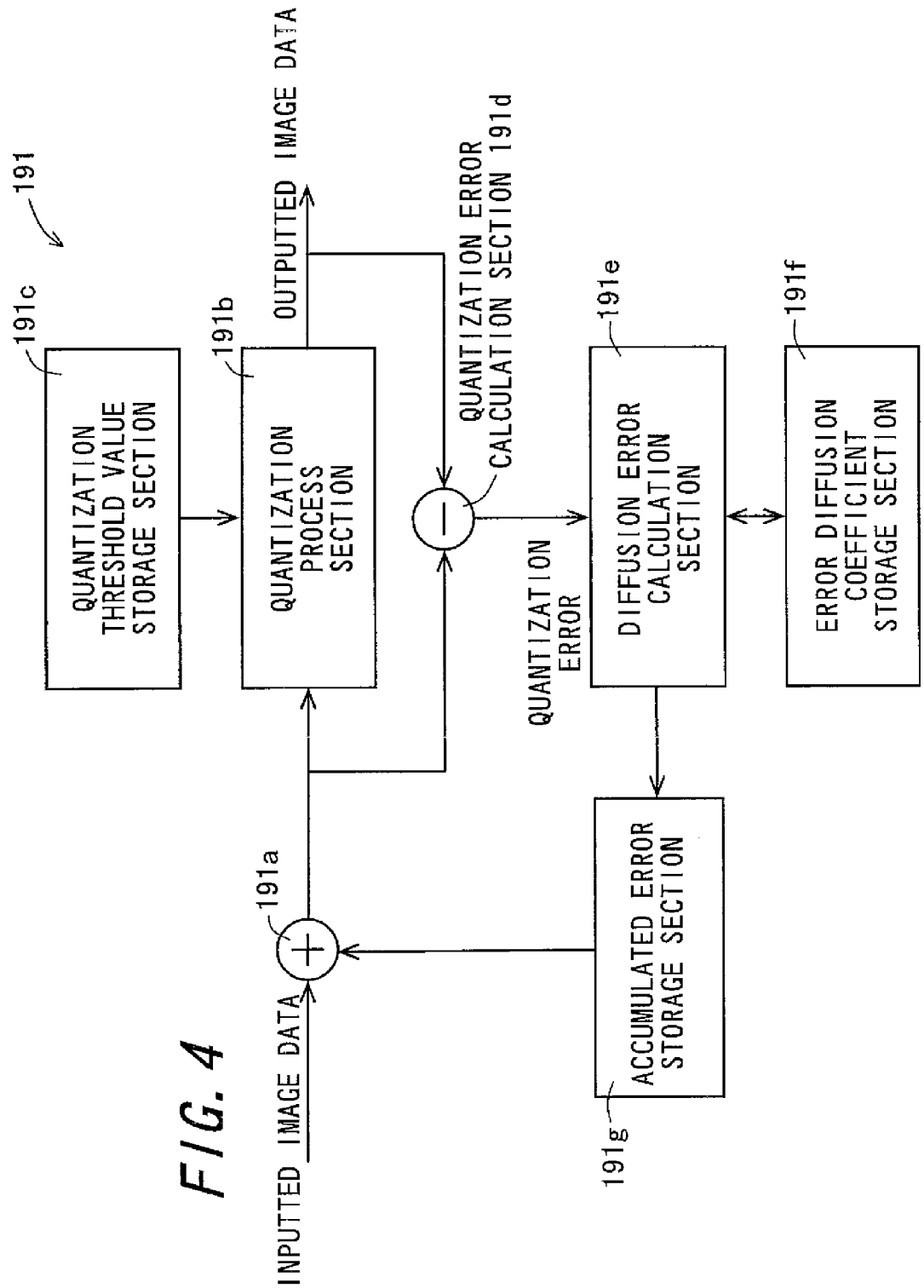
FIG. 4 is a block diagram showing a configuration of an error diffusion process section.

FIG. 4 is a block diagram showing a configuration of the error diffusion process section 191. The error diffusion process section 191 comprises an adder 191*a*, a quantization process section 191*b* including a comparator and so on, a quantization threshold value storage section 191*c* realized with a read only memory (ROM) and so on, a quantization error calculation section 191*d* composed of a subtracter and so on, a diffusion error calculation section 191*e* including a multiplier and so on, an error diffusion coefficient storage section 191*f* realized with a ROM and so on, and an accumulated error storage section 191*g* realized with a random access memory (RAM) and so on.

The adder 191*a* adds an accumulated error to the pixel value (density value) of each of the processing object pixels included in the image data inputted thereto, the accumulated error being stored in the accumulated error storage section 191*g* and being associated with the position of the pixel, and outputs the accumulated-error-added pixel value to the quantization process section 191*b*. The quantization process section 191*b* compares the accumulated-error-added pixel value with the quantization threshold value stored in the quantization threshold value storage section 191*c* to perform quantization, and outputs the quantized pixel value (hereinafter referred to as a quantization value) of the image data to the output selection section 193. The quantization error calculation section 191*d* obtains the difference (quantization error) between the pixel value inputted to the quantization process section 191*b* and the quantization value outputted from the quantization process section 191*b*, and outputs the quantization error thus obtained to the diffusion error calculation section 191*e*.

The diffusion error calculation section 191*e* calculates the diffusion error to be diffused to unprocessed pixels around the processing object pixel based on the quantization error and the matrix of the error diffusion coefficients stored in the error diffusion coefficient storage section 191*f*. The diffusion error thus calculated is stored in the accumulation error storage section 191*g*. It should be noted that the error diffusion coefficient storage section 191*f* stores a set of error diffusion coefficient matrixes, which is applied to all of the processing object pixels of the image data inputted thereto.

Figures 5A, 5B, 5C:
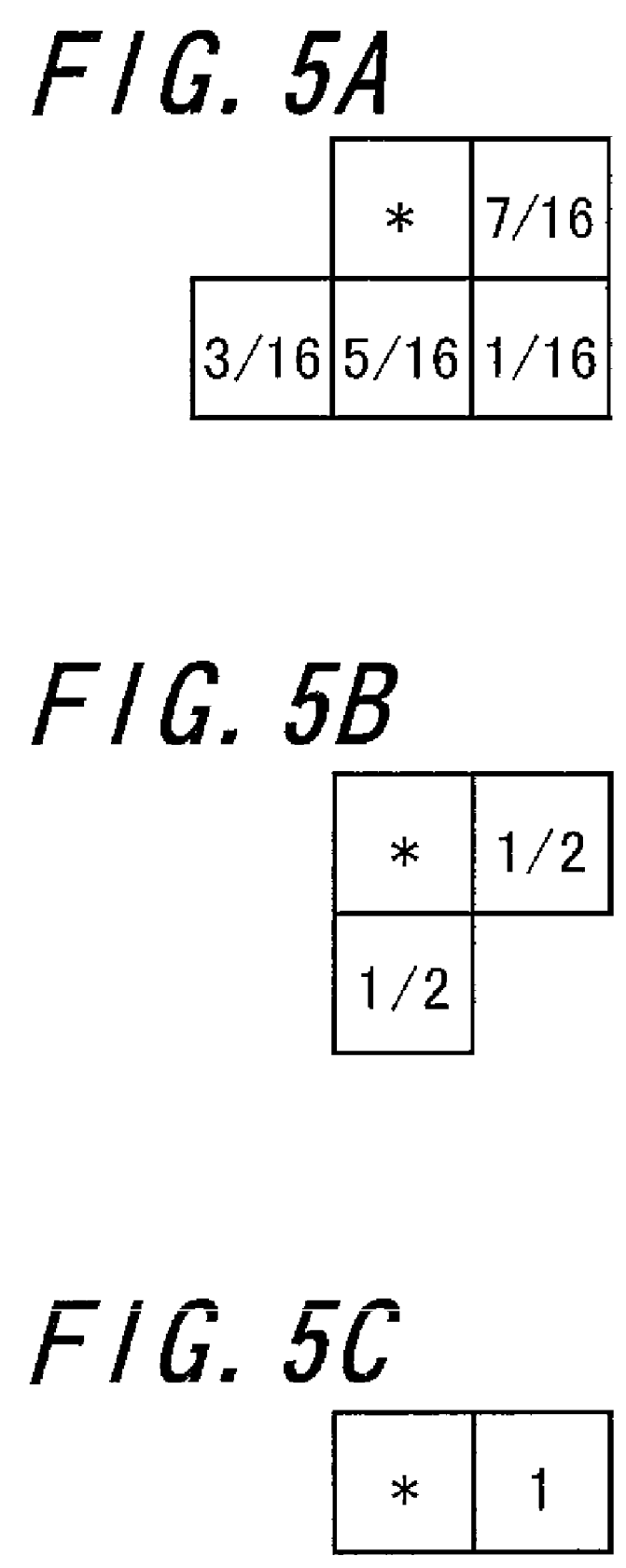

FIGS. 5A to 5C are diagrams showing examples of the error diffusion coefficient matrix. In FIGS. 5A to 5C, the processing object pixel to be quantized is denoted by "*", showing examples of the relative position of the unprocessed pixel to which the quantization error is diffused, to the processing object pixel and the error diffusion coefficient to each of unprocessed pixels.

FIG. 5A shows the error diffusion coefficient to each of the unprocessed pixels in the case in which it is expected that the textures or the worms are not generated in the reproduced gray level in the non-edge area.

FIG. 5B shows the error diffusion coefficients allowing the reduction of the processing circuit by reducing the number of the multipliers for multiplying the quantization error by the error diffusion coefficients in comparison with the case with FIG. 5A.

FIG. 5C is an example of substantially using the quantization error directly as the diffusion error of the pixel neighboring the processing object pixel, in which the multiplier for multiplying the quantization error by the error diffusion coefficient and the adder for obtaining the product sum of the diffusion errors are not required, and further, the buffer forming the accumulated error storage section is also not required since the quantization error can directly be added to the pixel value (density value) of the subsequent pixel.

The blue noise mask process section 192 performs the blue noise mask process on the pixel value (density value) of each of the processing object pixels of the image data inputted thereto, and outputs the blue-noise-mask-processed pixel values of the image data to the output selection section 193.

Figure 6:
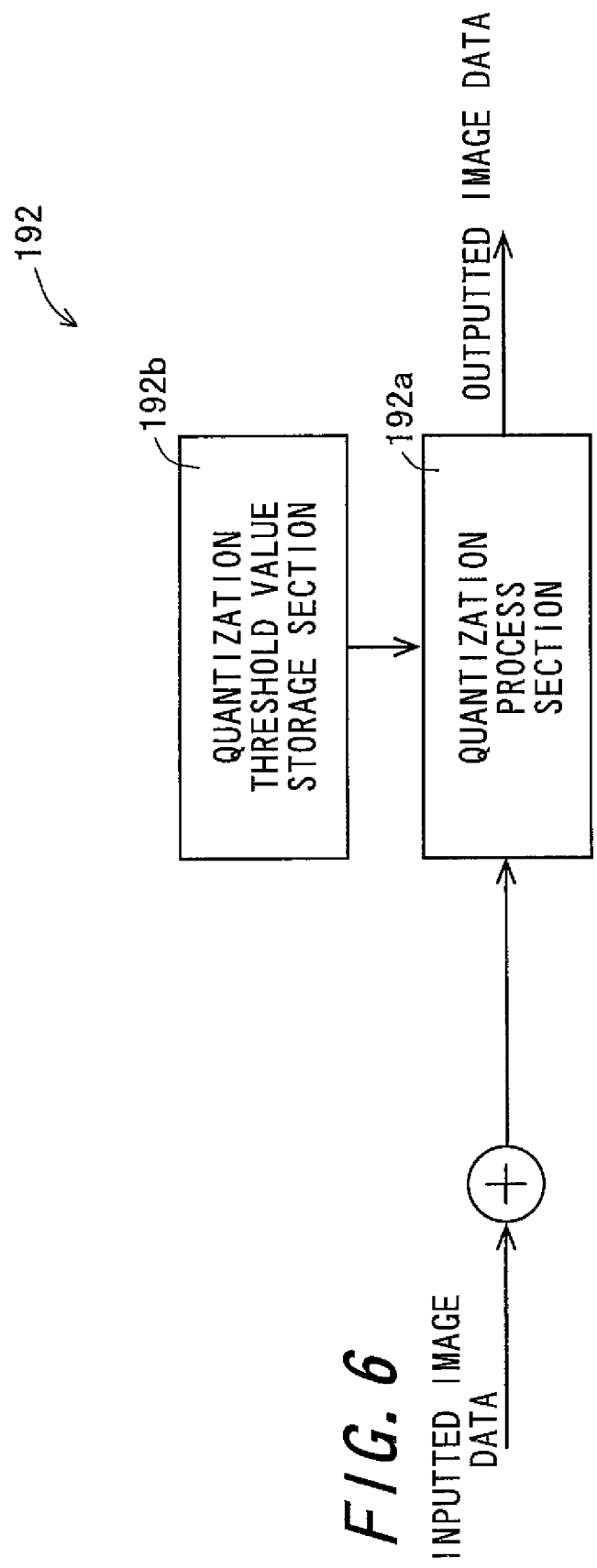
FIG. 6 is a block diagram showing a configuration of a blue noise mask process section.
Figure 7A:
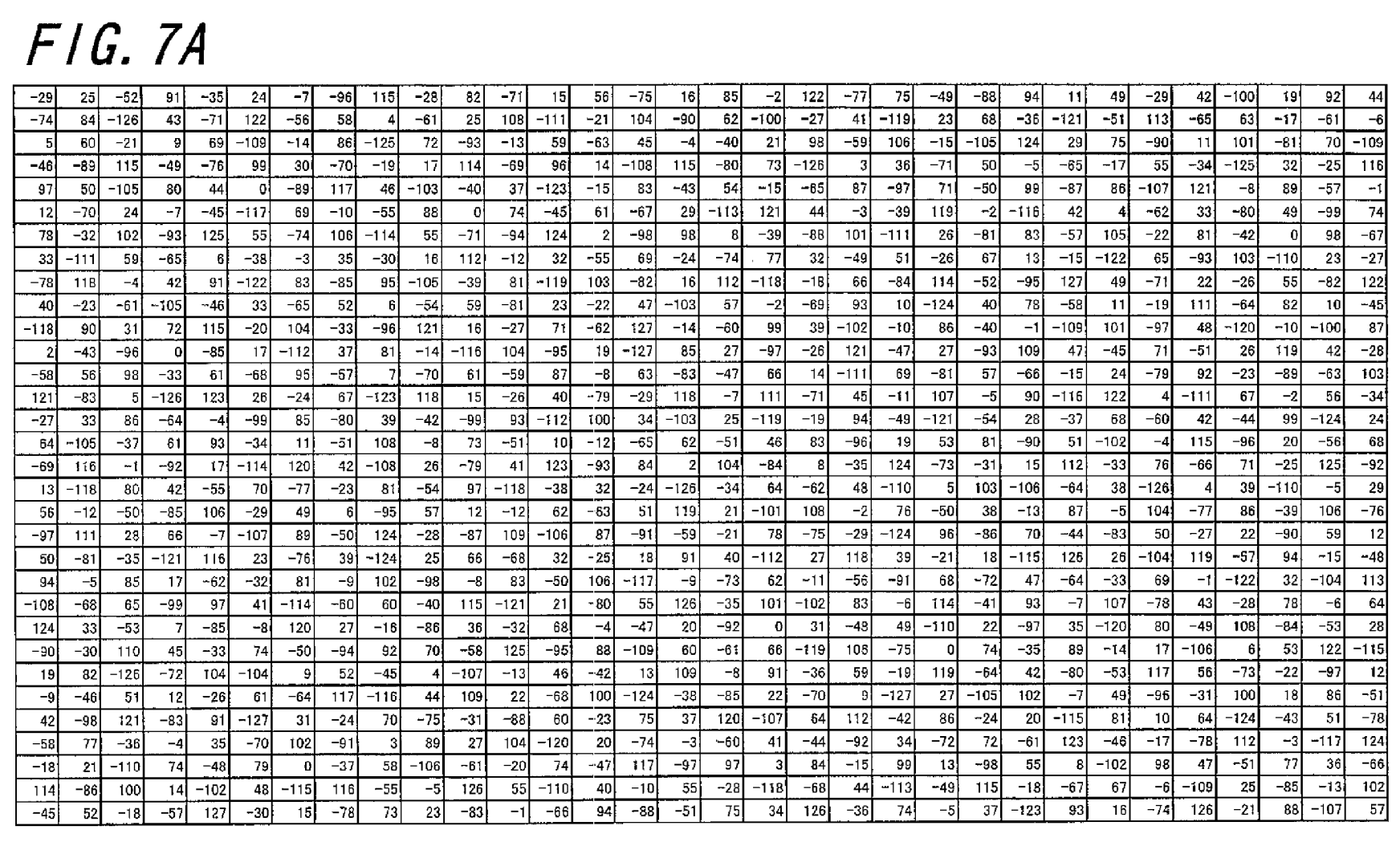
Figure 7B:
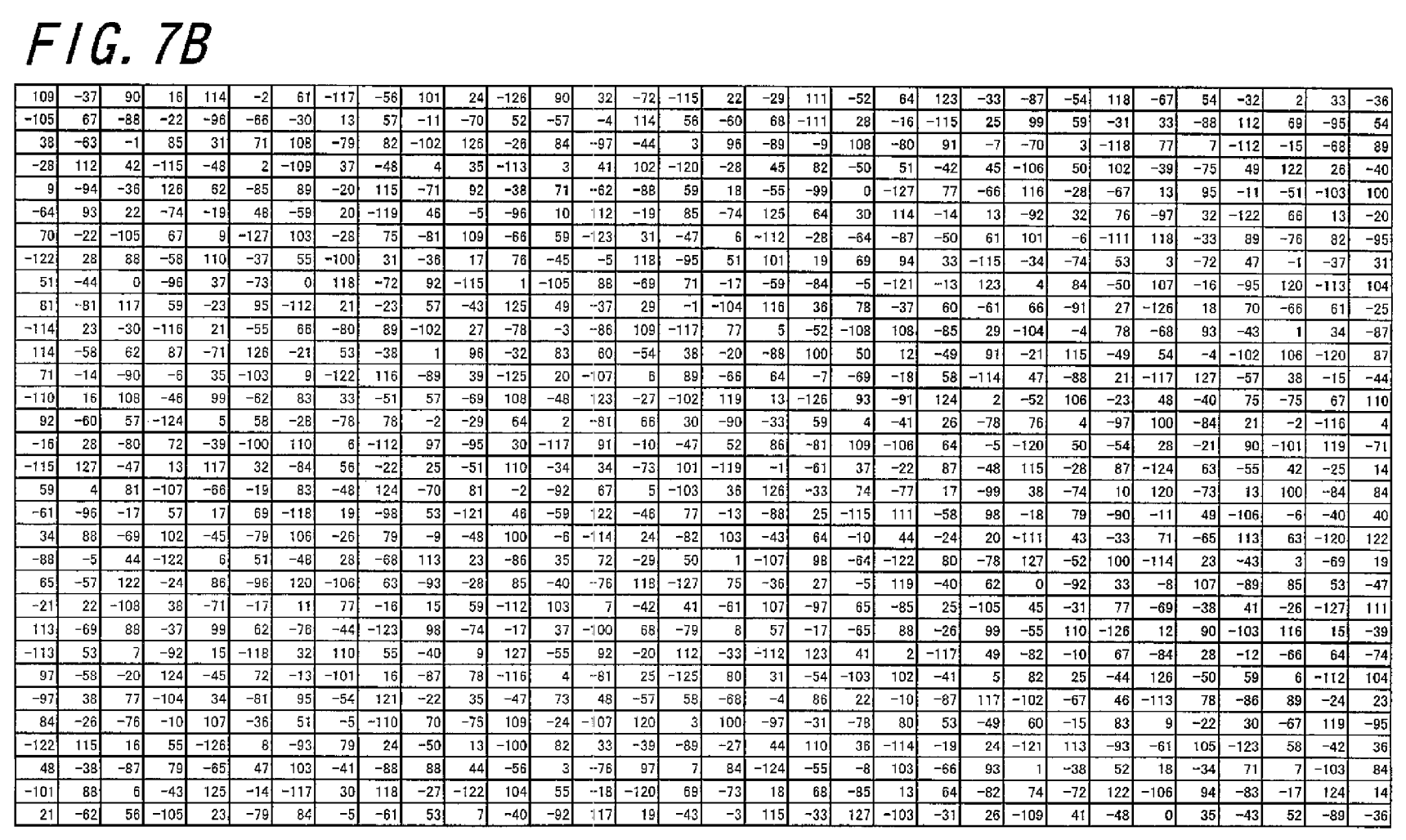
Figure 7C:
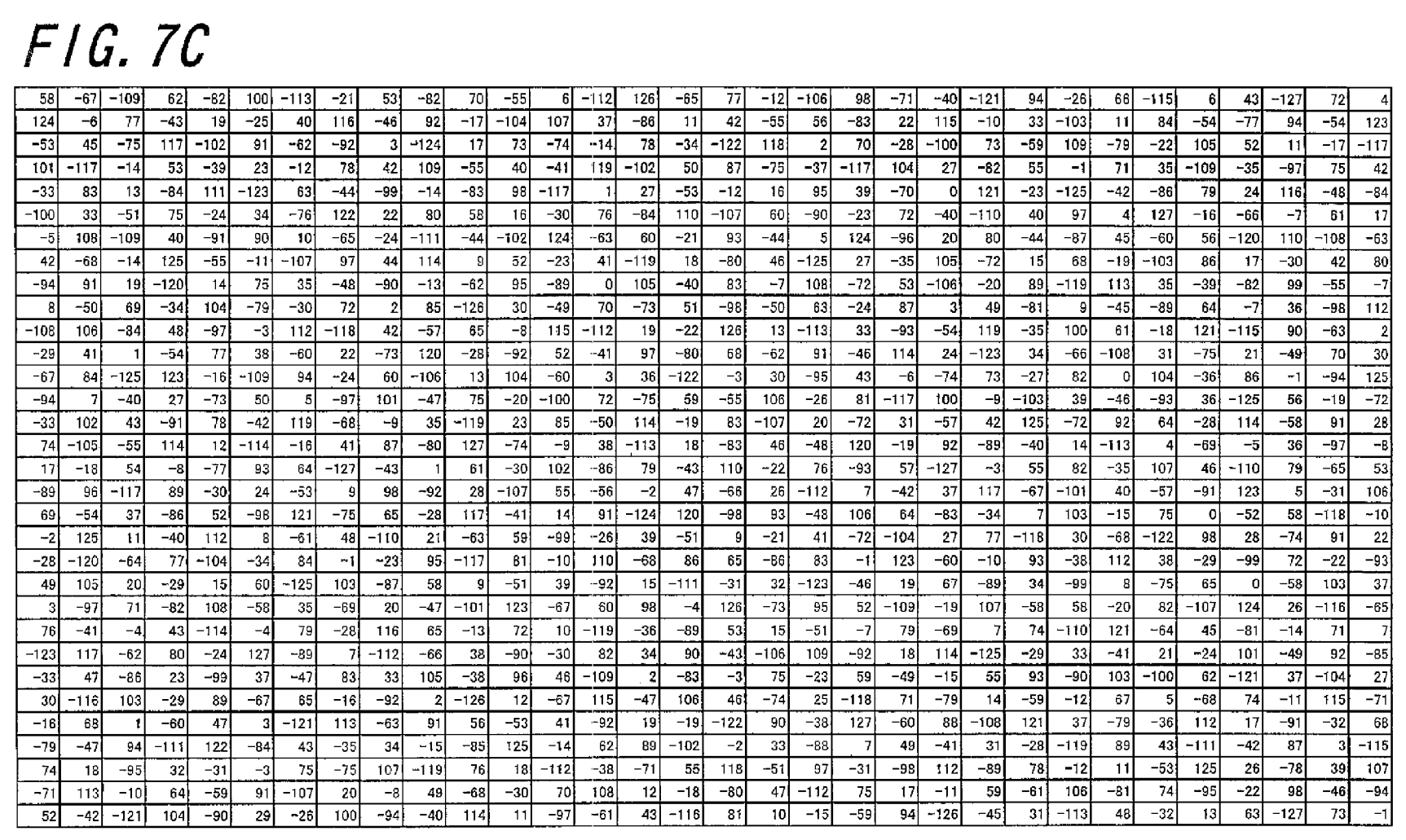
Figure 7D:
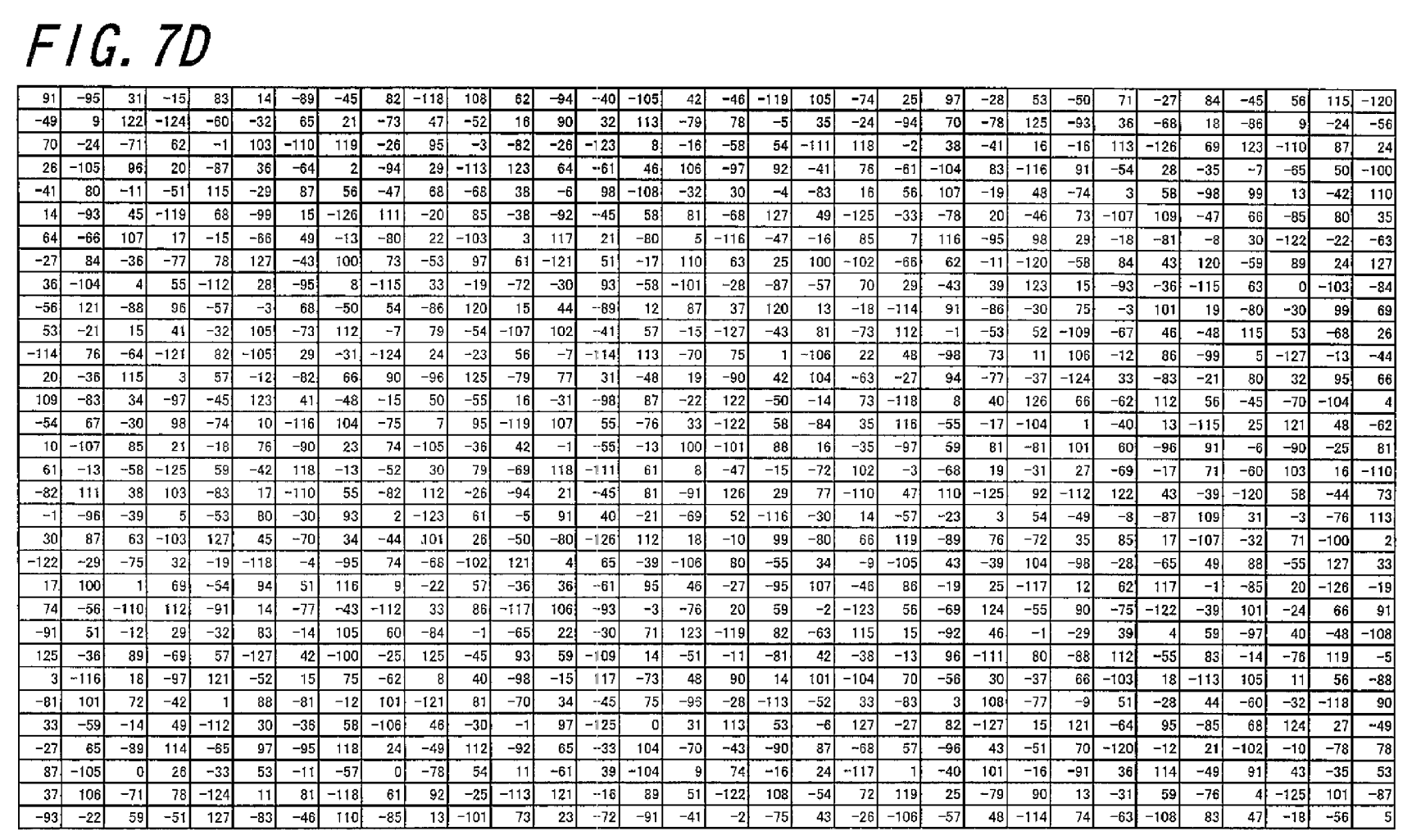

FIG. 6 is a block diagram showing a configuration of the blue noise mask process section 192. The blue noise mask process section 192 comprises a quantization process section 192*a* including a comparator and so on, and a quantization threshold value storage section 192*b* realized with a ROM. The quantization threshold value storage section 192*b* stores threshold masks having a property of the blue noise. FIGS. 7A to 7D are figures showing examples of the threshold mask for 32×32 pixels. FIG. 7A shows the threshold mask for cyan, FIG. 7B shows the threshold mask for magenta, FIG. 7C shows the threshold mask for yellow, and FIG. 7D shows the threshold mask for black. By thus setting the different threshold masks for respective color components, it can be made difficult for the output dots of a plurality of color components to overlap each other. As the threshold mask, the larger mask can preferably be stored.

The quantization process section 192*a* compares the pixel value added by the accumulated error with one of the quantization threshold values corresponding to each of the pixel positions in the threshold mask stored in the quantization threshold value storage section 192*b* to perform quantization.

The output selection section 193 selects either one of the outputted pixel value from the error diffusion process section 191 and the outputted pixel value from the blue noise mask process section 192 based on the segmentation class signal (classification information signal) corresponding to each of the pixels of the image data inputted thereto, and outputs it to the color image output apparatus 30 as the outputted image data. In the case in which the segmentation class signal indicates the character area or the halftone dot area, namely indicates the edge area, the output selection section 193 selects and outputs the outputted pixel value from the error diffusion process section 191, and in the case in which the segmentation class signal indicates an area other than the character area or the halftone dot area, namely indicates the non-edge area, the output selection section 193 selects and outputs the outputted pixel value from the blue noise mask process section 192.

Second Embodiment

In a second embodiment of the invention, the configuration of the tone reproduction process section 19 is simplified compared to one in the first embodiment of the invention, and configurations of other sections than the tone reproduction process section 19 are the same as in the first embodiment of the invention, and description thereof will be, therefore, omitted.

Figure 8:
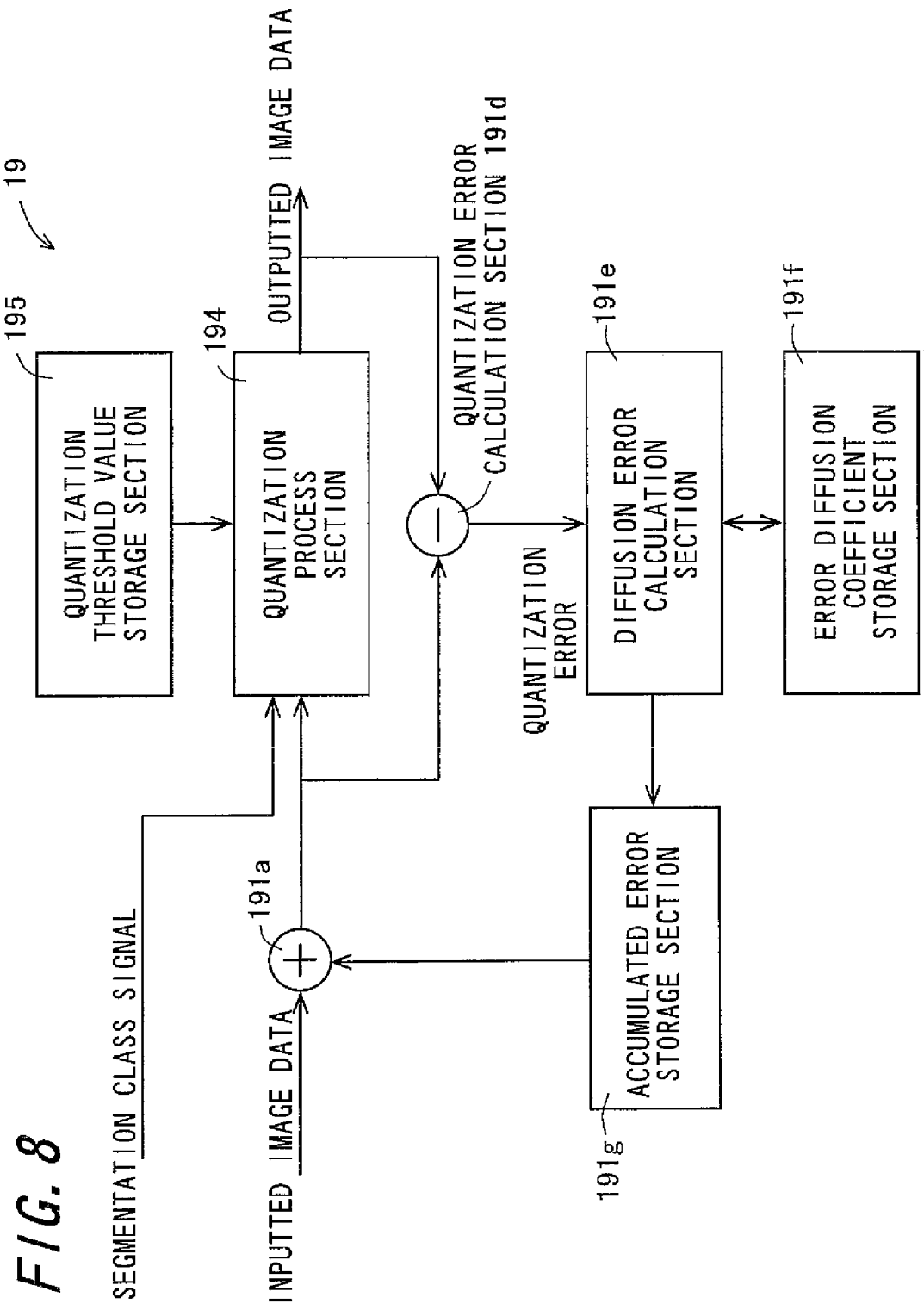
FIG. 8 is a block diagram showing a configuration of a tone reproduction section according to a second embodiment of the invention.

FIG. 8 is a block diagram showing a configuration of the tone reproduction section 19 according to the second embodiment of the invention. The tone reproduction process section 19 comprises an adder 191*a*, a quantization process section 194, a quantization threshold value storage section 195, a quantization error calculation section 191*d*, a diffusion error calculation section 191*e*, an error diffusion coefficient storage section 191*f* realized with a ROM and so on, and an accumulated error storage section 191*g*.

The configuration of the tone reproduction section 19 in the present embodiment is similar to the configuration of the error diffusion process section 191 in the first embodiment. They are different in the quantization process section 194 and the quantization threshold value storage section 195, and therefore, the configurations of other sections than these sections are denoted by the same reference numerals and description thereof will be omitted.

The quantization threshold value storage section 195 stores quantization threshold values for edge area and the threshold mask for the non-edge area other than the edge area. The segmentation class signal is inputted to the quantization process section 194, and the quantization process section 194 performs either one of the quantization using the quantization threshold values for the edge area and the quantization using the threshold mask for non-edge area based on the segmentation class signal thus inputted therein.

In the case in which the segmentation class signal indicates the character area or the halftone dot area, namely indicates the edge area, the quantization process section 194 retrieves the quantization threshold values for edge area from the quantization threshold storage section 195 to perform the quantization. In the case in which the segmentation class signal indicates an area other than the character area or the halftone dot area, namely indicates the non-edge area, the quantization process section 194 retrieves the threshold mask for the non-edge area from the quantization threshold storage section 195, and selects the threshold value corresponding to the pixel position to perform the quantization.

Further, it is possible to perform calculation assuming that the accumulated error is zero in the case in which the segmentation class signal indicates the non-edge area. By thus performing, the process similar to the blue noise mask process can be performed on the pixels in the non-edge area.

Third Embodiment

Figure 9:
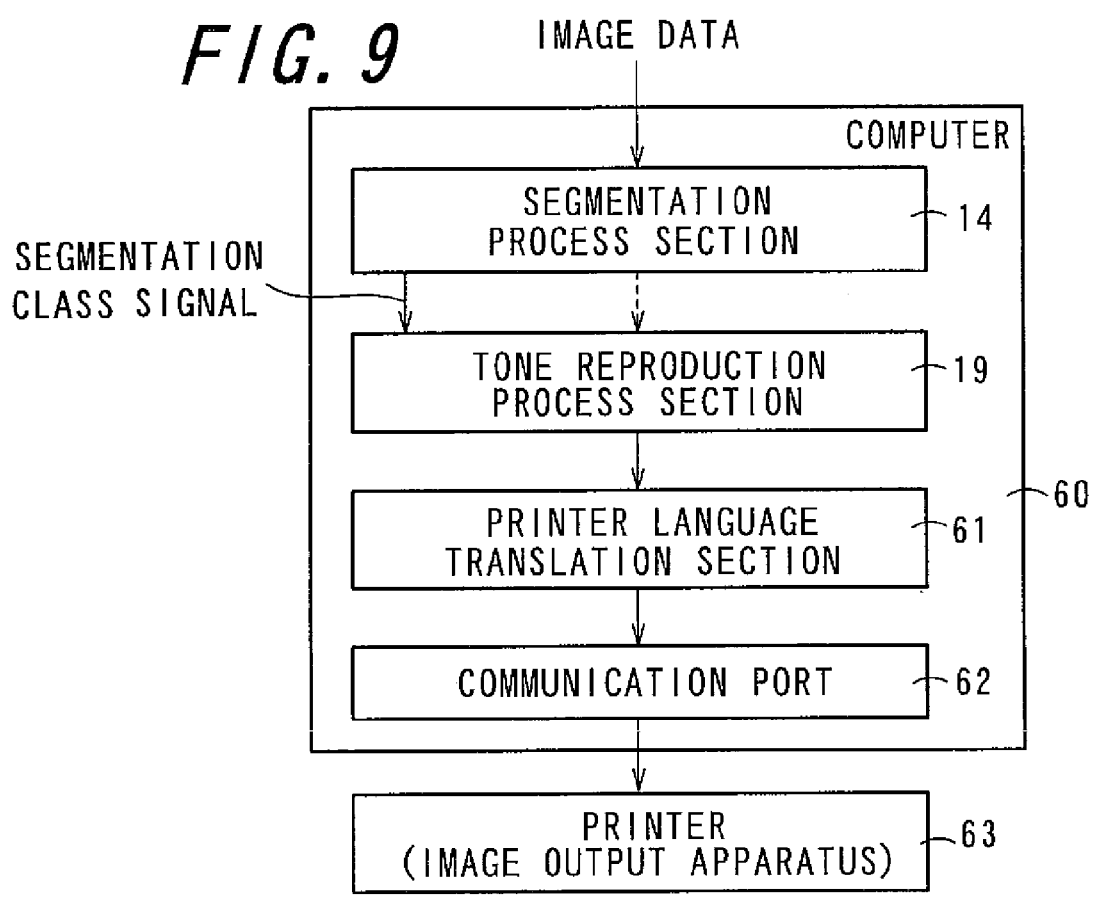
FIG. 9 is a diagram showing a configuration of a computer according to a third embodiment of the invention.

FIG. 9 is a diagram showing a configuration of a computer 60 according to a third embodiment of the invention. The computer 60 is configured including the segmentation process section 14, the tone reproduction process section 19, a printer language translation section 61, and a communication port 62, and is connected to a printer 63 as the image output apparatus 63. The same configurations as in the embodiments described above are denoted by the same reference numerals, and description thereof will be omitted.

The printer 63 can be a digital multi-function peripheral having a copy function and a facsimile function in addition to the printer function. Further, the printer 63 performs an electrophotographic image formation or an inkjet image formation.

The image data is inputted to the computer 60 from an image scanner such as a flatbed scanner or a film scanner, or a digital camera, for example, and stored in a storage device such as a hard disk drive (not shown).

On the image data created in the computer 60 by executing various application programs, or on the image data inputted to the computer 60, the processes described above are performed by the segmentation process section 14 and the tone reproduction process section 19.

It should be noted that although not shown in the drawings, the computer 60 also performs substantially the same processes as the color correction section 15, the black generation and under color removal section 16, the spatial filter process section 17, and so on of the image processing apparatus 10 in the first embodiment described above.

The data converted in the printer language translation section 61 into the printer language is outputted to the printer 63 via the communication port 62 (e.g., a Centronics port, a local area network (LAN) port).

Figure 10:
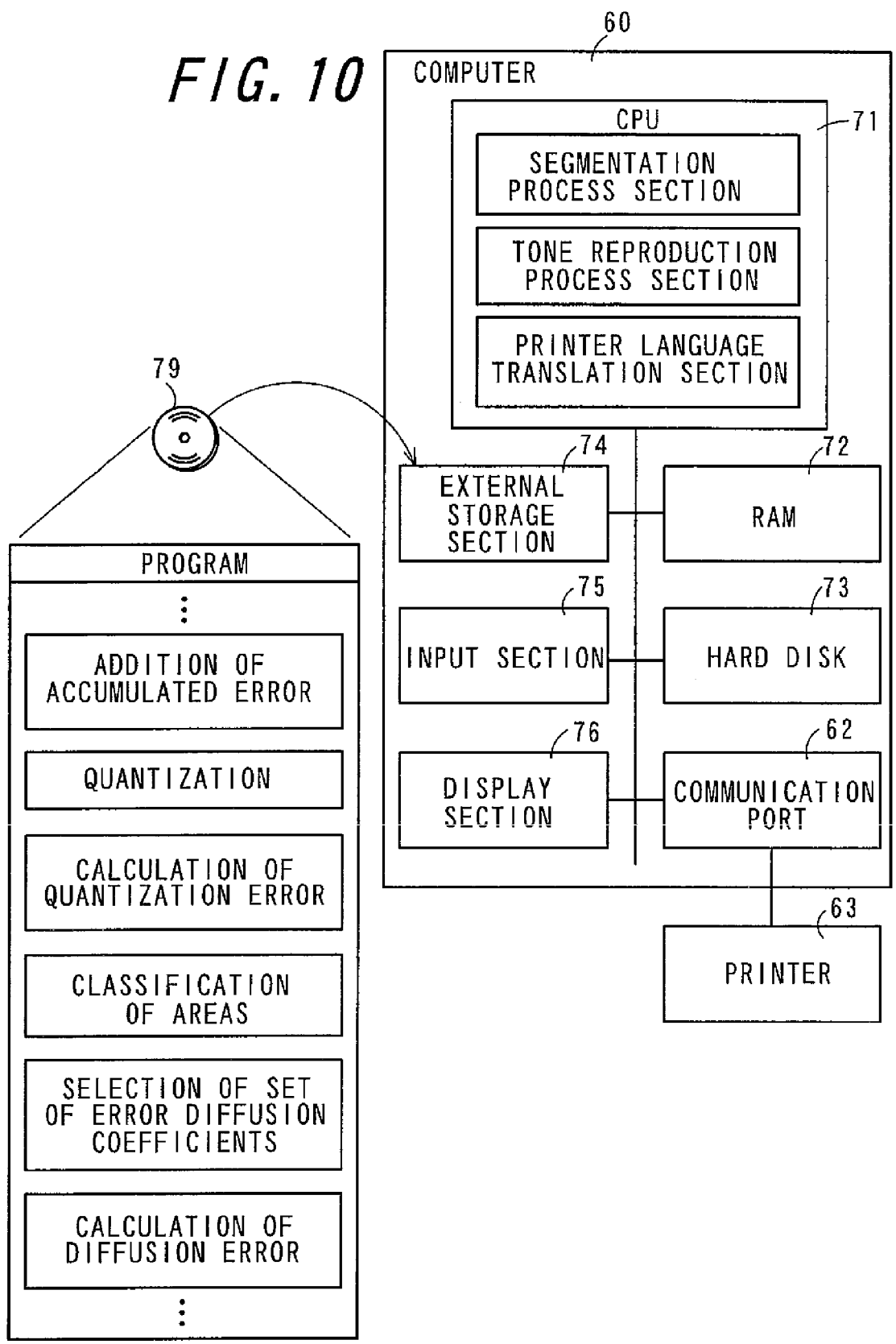
FIG. 10 is a block diagram showing a detailed configuration of a computer.

FIG. 10 is a block diagram showing a detailed configuration of the computer 60. The computer 60 comprises a CPU 71, a RAM 72, a hard disk drive 73, an external storage section 74 such as a flexible disk drive or a compact disk (CD) ROM drive, and a communication port 62 for performing communication control with the printer 63 and so on. Further, the computer 60 comprises an input section 75 such as a keyboard or a mouse, and a display section 76 such as a cathode ray tube (CRT) display or a liquid crystal display. Further, the communication port 62 includes a network card or a modem, and is capable of connecting to a communication network such as a LAN, the Internet, or a phone line.

The CPU 71 performs the control of each of the sections described above. Further, the CPU 71 stores a program or data accepted from the input section 75 or the communication port 62, or a program or data retrieved from the hard disk drive 73 or the external storage section 74 in the RAM 72, performs various processes such as execution of the program stored in the RAM 72 and calculation of the data stored therein, and stores various processing results or temporary data used for the various processes in the RAM 72. The data such as the operation results stored in the RAM 72 is stored in the hard disk drive 73 or outputted from the display section 76 or the communication port 62 by means of the CPU 71.

The CPU 71 operates as the segmentation process section 14, the tone reproduction process section 19, and the printer language translation section 61 describe above, and so on. Further, the image data is inputted to the computer 60 from, for example, a scanner or a digital camera, and stored in the hard disk drive 73. Further, the CPU 71 operates as the adder, the quantization process section, the quantization error calculation section, the diffusion error calculation section of the first embodiment (FIGS. 4 and 6) or in the second embodiment (FIG. 8). Further, RAM 72 or the hard disk drive 73 operates as the quantization threshold value storage section, the accumulated error storage section, and the error diffusion coefficient storage section. For example, the error diffusion coefficient matrix shown in FIGS. 5A to 5C are stored in the hard disk drive (storage section) 73.

By retrieving an image processing program recorded on a computer readable recording medium 79 such as a CD-ROM by the external storage section 74, storing the image processing program in the hard disk drive 73 or the RAM 72, and making the CPU 71 execute the image processing program, it becomes possible to make the computer 60 operate as various sections described above. Further, it is also possible to accept an image processing program from another apparatus with the communication port 62 connected to a LAN or the like, and to store the image processing program in the hard disk drive 73 or the RAM 72. It should be noted that an image processing program for realizing the halftone generation process according to the invention can be included in a printer driver or can be included in the image processing application software.

Figure 11:
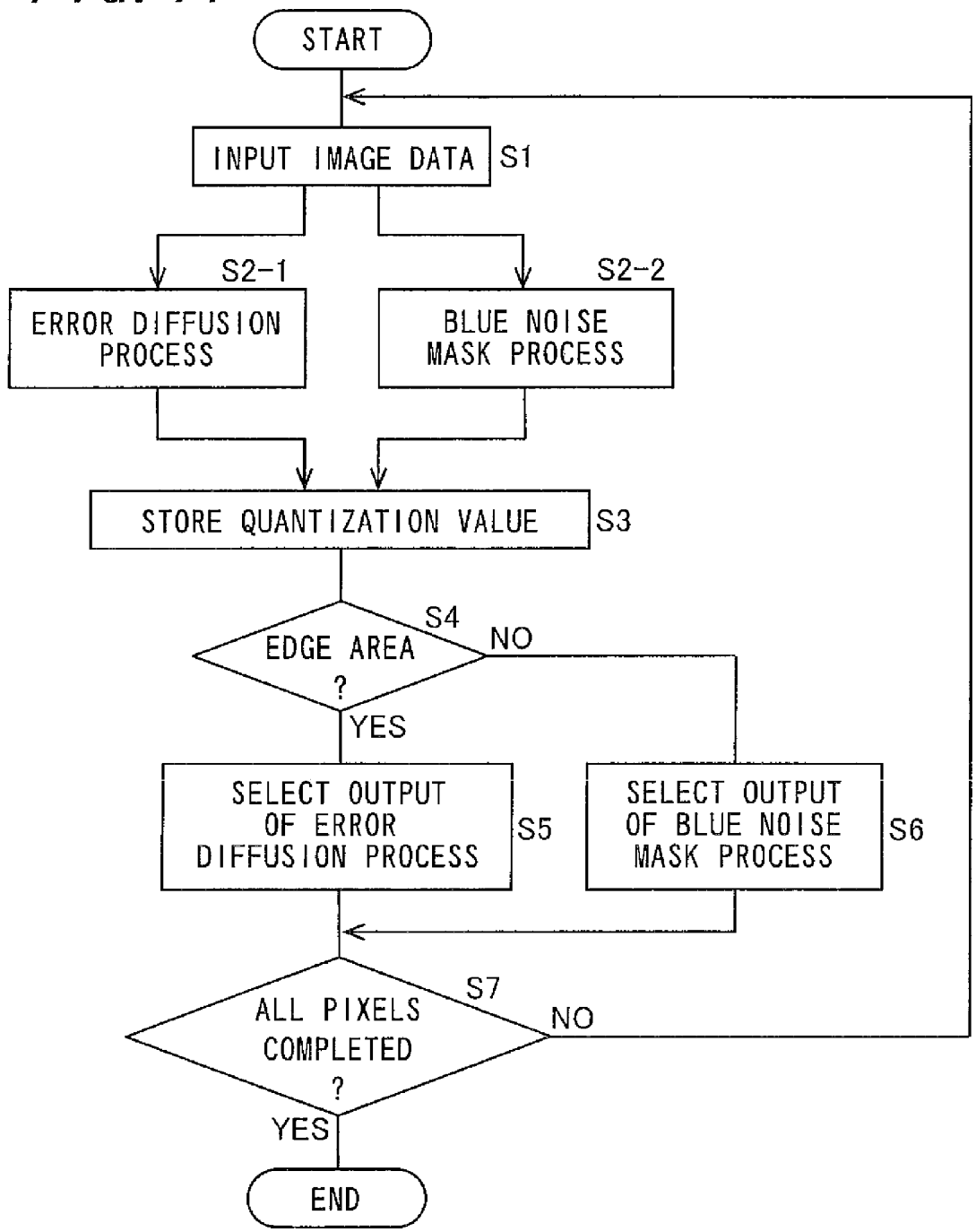
FIG. 11 is a flowchart showing a halftone generation process by a tone reproduction process section according to the first embodiment of the invention.

FIG. 11 is a flowchart showing the halftone generation process by the tone reproduction process section 19 according to the first embodiment of the invention.

Firstly, when the image data is inputted to the tone reproduction process section 19 in Step S1, the error diffusion process section 191 performs the error diffusion process in Step S2-1 to calculate the quantization value, and in parallel thereto, the blue noise mask process section 192 performs the blue noise mask process in Step S2-2 to calculate the quantization value. In Step S3, the quantization values thus obtained respectively are temporarily stored in the storage section such as the RAM.

In Step S4, the output selection section 193 judges whether or not the quantized pixel belongs to the edge area based on the segmentation class signal. If the pixel belongs to the edge area, the process proceeds to Step S5 to select the quantization value outputted from the error diffusion process section 191, and if the pixel does not belong to the edge area, the process proceeds to Step S6 to select the quantization value outputted from the blue noise mask process section 192. In Step S7, whether or not the quantization has been completed in all of the pixels is judged, and if the quantization has been completed, the process is terminated, and if it has not been completed yet, the process returns to Step S1.

Figure 12:
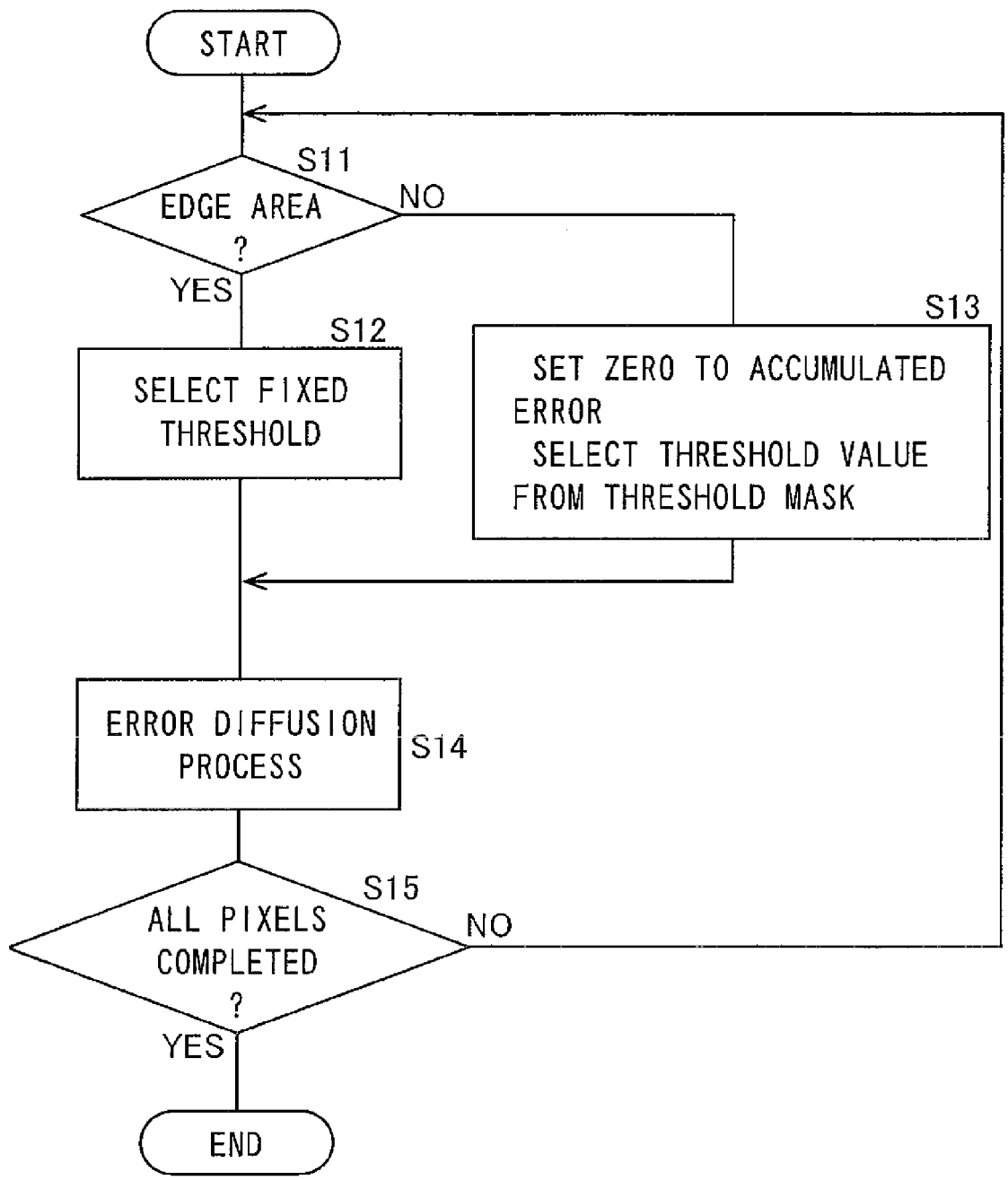
FIG. 12 is a flowchart showing a halftone generation process by a tone reproduction process section according to the second embodiment of the invention.

FIG. 12 is a flowchart showing the halftone generation process by the tone reproduction process section 19 according to the second embodiment of the invention.

In Step S11, the quantization process section 194 judges whether or not the inputted pixel belongs to the edge area based on the segmentation class signal. If the pixel belongs to the edge area, the process proceeds to Step S12 to select and retrieve the fixed threshold value for the edge area from the quantization threshold value storage section 195, and if the pixel does not belong to the edge area, the process proceeds to Step S13 to set the accumulated error to zero and select and retrieve the threshold value corresponding to the pixel position from the threshold mask for the non-edge area from the quantization threshold value storage section 195.

In Step S14, each of the sections performs calculation using the selected threshold value and the quantization value is outputted. In Step S15, whether or not the quantization has been completed in all of the pixels is judged, and if the quantization has been completed, the process is terminated, and if it has not been completed yet, the process returns to Step S11.

Figure 13:
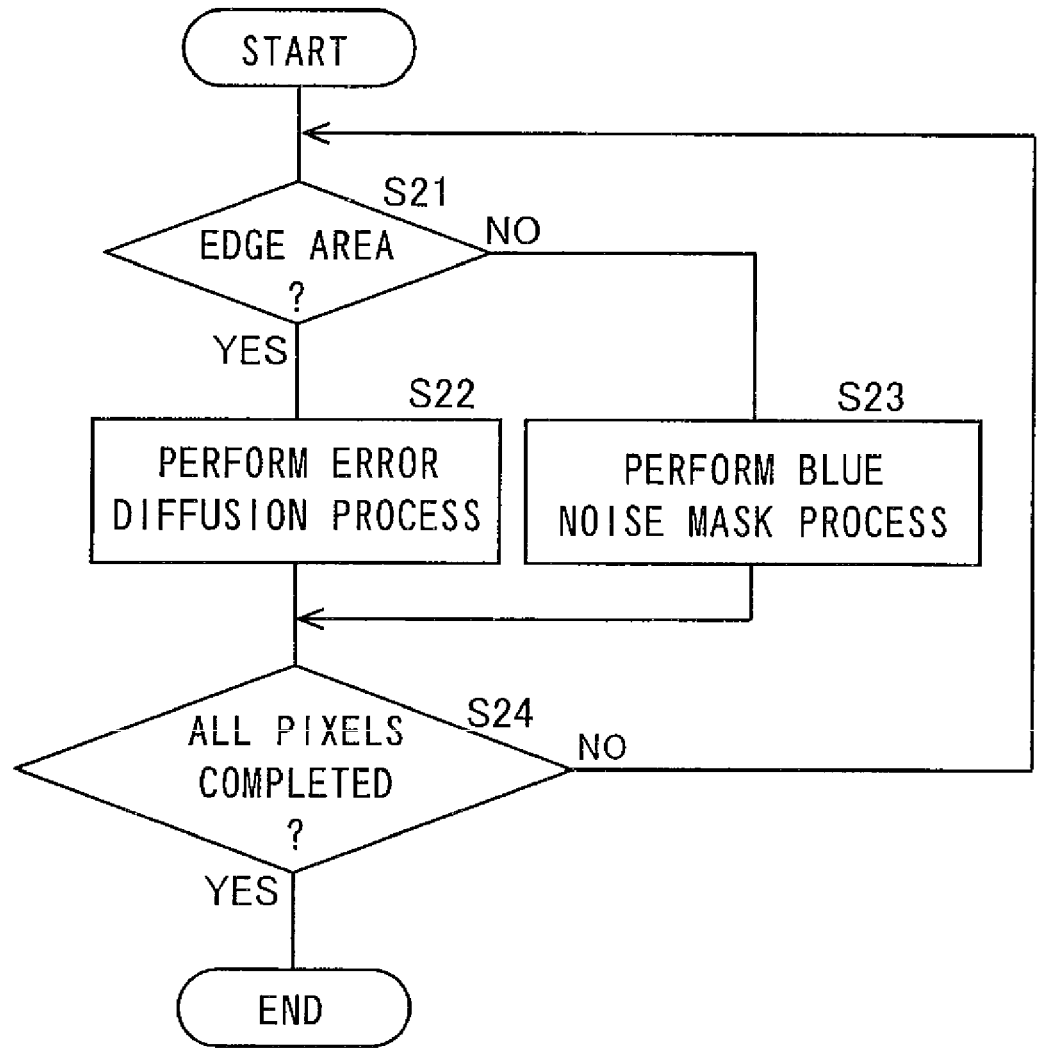
FIG. 13 is a flowchart showing a halftone generation process according to another embodiment of the invention.

FIG. 13 is a flowchart showing a halftone generation process according to another embodiment of the invention.

Firstly, in Step S21, whether or not the processing object pixel belongs to the edge area is judged previously, and if the processing object pixel belongs to the edge area, the process proceeds to Step S22, and if the processing object pixel does not belong to the edge area, the process proceeds to Step S23. In Step S22, the error diffusion process is performed to calculate the quantization value, and the quantization value is outputted. In Step S23, the blue noise mask process is performed to calculate the quantization value, and the quantization value is outputted. In Step S24, whether or not the quantization has been completed in all of the pixels is judged, and if the quantization has been completed, the process is terminated, and if it has not been completed yet, the process returns to Step S21.

Further, as another embodiment of the invention, it is possible to provide the program codes of the image processing program for making the computer operate as the image processing apparatus 10 and a computer readable recording medium recording the program codes of the image processing program.

It should be noted that regarding the recording medium, the memory used for performing the process by the microprocessor, for example, ROM itself can be the recording medium, or a program reading apparatus can be provided as the external storage section 74 of the computer, and in such a case, the recording medium, which can be read by inserting the external storage section 74, can also be used as the recording medium.

In either case, the program codes of the image processing program recorded thereon can be executed by the microprocessor accessing the recording medium, or by the microprocessor retrieving the program codes from the recording medium and downloading the retrieved program codes to the program storage area. It should be noted that the program for downloading is assumed to be previously stored in a predetermined storage device. The microprocessor such as the CPU performs overall control of each section of the computer so as to perform a predetermined image processing along the image processing program installed therein.

Further, the recording medium readable by the program reading apparatus can be a medium for statically recording the program including tapes such as a magnetic tape or a cassette tape, disks such as a magnetic disk such as a flexible disk or a hard disk, or an optical disk such as a compact disc read only memory (CD-ROM), a magnetooptical disc (MO), a mini disc (MD), or a digital versatile disc (DVD), cards such as an integrate circuit (IC) card (including a memory card) or an optical card, or a semiconductor memory such as a masked ROM, an erasable programmable read only memory (EPROM), an electrically erasable programmable read only memory (EEPROM), and a flash ROM.

Further, the computer is arranged to has the configuration capable of connecting to the communication network including the Internet, and the medium can dynamically hold the program such that the program codes of the image processing program is downloaded from the communication network. It should be noted that in the case in which the image processing program is downloaded from the communication network as described above, the program for downloading can previously be stored in the computer or can be installed from another recording medium. It should be noted that the invention can also be realized in a form of a computer data signal embedded in a carrier wave which is realized by the electronic transmission of the program codes described above.

An example of the computer system for executing the program codes of the image processing program read from the recording medium is a system configured including an image reading apparatus such as a flatbed scanner, a film scanner, or a digital camera, a computer for performing various processes including the image processing method described above by executing various programs, an image display apparatus such as a cathode-lay tube (CRT) display or a liquid crystal display for displaying the processing results of the computer, and an image output apparatus such as a printer for outputting the processing results of the computer on paper and so on, which are connected to each other. Further, the computer system is provided with a modem for connecting the computer system to a server and so on via the communication network and for transmitting and receiving various kinds of data such as various programs including the image processing program or the image data.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing apparatus comprising:
a segmentation process section, which performs classification processing for an object pixel based on a pixel surrounding the object pixel, for classifying whether each of pixels forming inputted image data belongs to at least an edge area or a non-edge area; and
a tone reproduction process section for converting the inputted image data into an image data with a predetermined gray level and outputting the converted image data,
the tone reproduction process section including:
an error diffusion process section for performing conversion of gray level using an error diffusion method;
a blue noise mask process section for performing conversion of the gray level using a blue noise mask method; and
an output selection section for outputting a gray level value converted by the error diffusion process section in the case in which the object pixel belongs to the edge area, and outputting a gray level value converted by the blue noise mask process section in the case in which the pixel belongs to the non-edge area.

2. The image processing apparatus of claim 1, wherein the error diffusion process is performed using a set of error diffusion coefficients.

3. The image processing apparatus of claim 1, wherein the pixels to which the error is diffused based on the error diffusion coefficient are, related to the object pixel, an unprocessed next pixel, a pixel in the same position on the next line, and pixels on both of left and right sides of the pixel in the same position on the next line.

4. The image processing apparatus of claim 1, wherein the pixels to which the error is diffused based on the error diffusion coefficient are, related to the object pixel, an unprocessed next pixel and a pixel in the same position on the next line.

5. The image processing apparatus of claim 1, wherein the pixel to which the error is diffused based on the error diffusion coefficient is an unprocessed next pixel related to the object pixel.

6. The image processing apparatus of claim 1, wherein each of the pixels includes a plurality of color components, and
the tone reproduction process section performs conversion of the gray level for each of the color components, and selects the threshold mask for each of the color components.

7. An image forming apparatus comprising:
an image input apparatus for inputting image data to an image processing apparatus;
the image processing apparatus of claim 1; and
an image output apparatus for forming an image based on the image data with a gray level converted by the image processing apparatus.

8. An image processing apparatus comprising:
a segmentation process section, which performs classification processing for an object pixel based on a pixel surrounding the object pixel, for classifying whether each of pixels forming inputted image data belongs to at least an edge area or a non-edge area; and
a tone reproduction process section for converting the inputted image data into an image data with a predetermined gray level and outputting the converted image data,
wherein the tone reproduction section performs the conversion of the gray level using an error diffusion method, and
selects a fixed threshold value in the case in which the object pixel belongs to the edge area, and selects a threshold value corresponding to a position of the object pixel from a threshold mask to quantize a gray level value by a threshold process using the selected threshold value.

9. The image processing apparatus of claim 8, wherein the tone reproduction process section stores an error diffusion coefficient for the edge area and an error diffusion coefficient for the non-edge area, and
selects the error diffusion coefficient for the edge area in the case in which the object pixel belongs to the edge section, selects the error diffusion coefficient for the non-edge area in the case in which the pixel belongs to the non-edge section, and calculates the diffusion error using the selected error diffusion coefficient.

10. The image processing apparatus of claim 9, wherein the tone reproduction process section does not substantially carry out the error diffusion by the error diffusion method in the case in which the object pixel belongs to the non-edge area.

11. The image processing apparatus of claim 8, wherein the error diffusion process is performed using a set of error diffusion coefficients.

12. The image processing apparatus of claim 8, wherein the pixels to which the error is diffused based on the error diffusion coefficient are, related to the object pixel, an unprocessed next pixel, a pixel in the same position on the next line, and pixels on both of left and right sides of the pixel in the same position on the next line.

13. The image processing apparatus of claim 8, wherein the pixels to which the error is diffused based on the error diffusion coefficient are, related to the object pixel, an unprocessed next pixel and a pixel in the same position on the next line.

14. The image processing apparatus of claim 8, wherein the pixel to which the error is diffused based on the error diffusion coefficient is an unprocessed next pixel related to the object pixel.

15. The image processing apparatus of claim 8, wherein each of the pixels includes a plurality of color components, and
the tone reproduction process section performs conversion of the gray level for each of the color components, and selects the threshold mask for each of the color components.

16. An image forming apparatus comprising:
an image input apparatus for inputting image data to an image processing apparatus;
the image processing apparatus of claim 8; and
an image output apparatus for forming an image based on the image data with a gray level converted by the image processing apparatus.

17. An image processing method comprising:
a segmentation process step of performing classification processing for an object pixel based on a pixel surrounding the object pixel, and classifying whether each of pixels forming inputted image data belongs to at least an edge area or a non-edge area; and
a tone reproduction process step of converting the inputted image data into an image data with a predetermined gray-scale and outputting the converted image data,
wherein in the tone reproduction process step, the conversion of the gray-scale is performed by the error diffusion method in the case in which the processing object pixel belongs to the edge area, and the conversion of the gray-scale is performed by the blue noise mask method in the case in which the pixel belongs to the non-edge area.

18. A computer readable recording medium recording an image processing program for making a computer execute the image processing method of claim 17.

19. An image processing method comprising:
a segmentation process step of performing classification processing for an object pixel based on a pixel surrounding the object pixel, and classifying whether each of pixels forming inputted image data belongs to at least an edge area or a non-edge area; and
a tone reproduction process step of converting the inputted image data into an image data with a predetermined gray-scale and outputting the converted image data, the tone reproduction process step including:
a selection step of selecting a fixed threshold value in the case in which a processing the object pixel belongs to the edge area, and selecting a threshold value corresponding to a position of the processing object pixel from a threshold mask;
a quantization step of quantizing the gray-scale value by a threshold process using the selected threshold value; and
an error diffusion step of performing the error diffusion using the error diffusing method.

20. A computer readable recording medium recording an image processing program for making a computer execute the image processing method of claim 19.

* * * * *